Oct. 23, 1962

T. I. HARRIS ETAL 3,059,532

OPTICAL SYSTEM

Filed Jan. 12, 1959

Inventors:
Irving C. Sandback
Thomas I. Harris
By Robert F. Miehle, Atty.

3,059,532
OPTICAL SYSTEM
Thomas I. Harris, Mundelein, and Irving C. Sandback, Morton Grove, Ill., assignors to Bell & Howell Company, Chicago, Ill., a corporation of Illinois
Filed Jan. 12, 1959, Ser. No. 786,276
2 Claims. (Cl. 88—57)

This invention relates to an optical system, and more particularly to a highly corrected afocal telephoto attachment for use with a prime lens of a camera.

An object of the invention is to provide a telephoto objective in which the positive power is divided between a plurality of components to provide high corrections of both axial and lateral color.

Another object of the invention is to provide a highly corrected telephoto attachment which is very compact.

Still another object of the invention is to provide an optical attachment having a rear component which is very thick so that the size of the attachment is minimized.

A further object of the invention is to provide a telephoto attachment very compact in size and highly corrected for both third and higher order optical aberrations. The attachment may include a positive multicomponent front member and a negative rear member.

It is to be understood that the terms "front" and "rear" as herein used refer to the ends of the objective respectively nearer the longer and shorter conjugates thereof.

Figure 1:
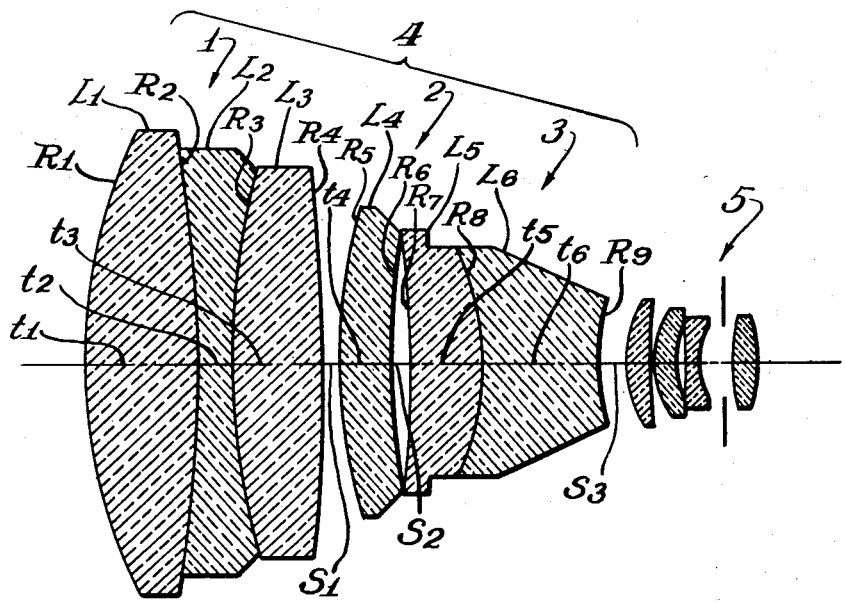
Figure 2:
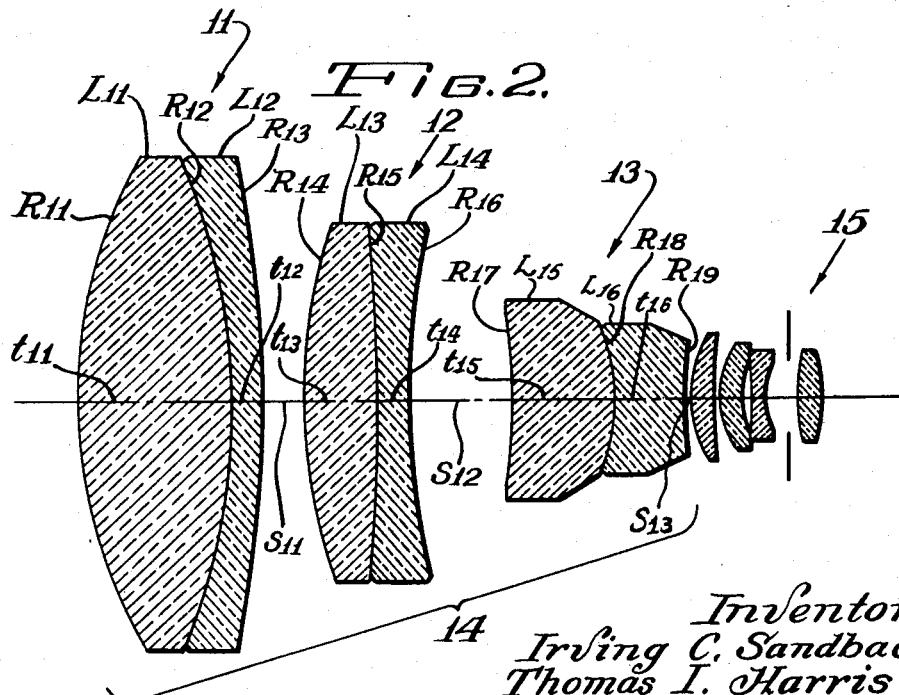

In the accompanying drawings:

FIG. 1 is a longitudinal section of an objective forming a specific embodiment of the invention; and FIG. 2 is a longitudinal section of an objective forming a modification of the objective shown in FIG. 1.

The invention provides a lens system which may be in the form of a telephoto attachment in which the axial thicknesses of the glass comprise at least sixty-five percent of the overall length of the system. The attachment has a front positive group of components at least one of which is compounded and a thick negative rear component, and is highly corrected for both axial and lateral color aberrations as well as the other optical aberrations.

Referring to FIG. 1 of the drawings, there is shown an optical objective including components 1, 2 and 3 forming an afocal telephoto attachment 4 for use with a prime lens 5 of a camera. The components 1, 2 and 3 include lenses $L_1$ to $L_6$ having radii of curvature of their optical surfaces $R_1$ to $R_9$, axial thicknesses $t_1$ to $t_6$, and axial separations $s_1$ and $s_2$. The component 1 is a cemented biconvex triplet, the component 2 a simple positive meniscus concave to the rear and the component 3 a biconcave cemented doublet. The component 2 also may be compounded to increase chromatic correction.

The components 1 and 2 are positive and constitute a positive group or member which is highly corrected for color both axial and lateral and the component 3 is a negative member. For compactness of the attachment, the axial thickness of the component 3 should be at least twenty percent of the overall axial length of the attachment. Also, to obtain a high degree of correction of higher order spherical aberration, coma and astigmatism as well as to correct other optical aberrations, the attachment should comply substantially with the following algebraic inequalities:

$$.500 < \frac{{}^R F_1}{f_1} < 1.000$$

$$-10.0 < \frac{{}^R R_1}{f_1} < -1.000$$

$$.700 < \frac{{}^R F_2}{f_{1+2}} < 1.300$$

$$.800 < \frac{{}^R R_2}{f_{1+2}} < 2.000$$

$$1.000 < \frac{{}^R F_3}{f_3} < 10.000$$

$$-2.000 < \frac{{}^R R_3}{f_3} < -.6000$$

where, of the three components, $^RF_1$ and $^RR_1$ designate, respectively, the first and last surfaces of component 1, $^RF_2$ and $^RR_2$ the first and last surfaces of the second component, $^RF_3$ and $^RR_3$ the first and last surfaces of the rear component, $f_1$ the focal length of component 1, $f_{1+2}$ the combined focal length of the components 1 and 2 and $f_3$ the focal length of the component 3.

To keep the aberrations at a minimum, the attachment also should comply with the following algebraic inequality:

$$.300 < \frac{1}{R'_{R1}} + \frac{1}{R'_{R2}} - \frac{1}{F'_3} < .800$$

where $R'_{R1}$, $R'_{R2}$ and $F'_3$ are algebraic numbers corresponding to the numbers of inches of $R_{R1}$, $R_{R2}$ and $F_3$.

Superior correction for distortion and reduced size is achieved through the use of high index glass and thick elements in the attachment shown in FIG. 1 and its magnification is 2.058. The component 1 is made up of three elements principally to achieve superior correction of both axial and lateral color. To achieve compactness, the combined thicknesses of the components must be at least sixty-five percent of the length of the unit, the thickness of the rear component 3 should be at least twenty percent of the overall length of the attachment.

A preferred example of the attachment shown in FIG. 1 is constructed in compliance with the following example in which dimensions are in terms of inches, $n_d$ designates the indices of refraction for the sodium D line and V the Abbe dispersion numbers:

$$f_1 = 2.3014 \quad f_{1+2} = 1.8889 \quad f_3 = -.9165$$

| | | | | |
|---|---|---|---|---|
| $L_1$ | $R_1 = +1.950$ | $t_1 = .457$ | $n_d = 1.697$ | $V = 56.2$ |
| $L_2$ | $R_2 = -4.567$ | $t_2 = .120$ | $n_d = 1.720$ | $V = 29.3$ |
| $L_3$ | $R_3 = +2.737$ | $t_3 = .350$ | $n_d = 1.697$ | $V = 56.2$ |
| | $R_4 = 6.326$ | $s_1 = .060$ | | |
| $L_4$ | $R_5 = +2.0689$ | $t_4 = .200$ | $n_d = 1.697$ | $V = 56.2$ |
| | $R_6 = +2.894$ | $s_2 = .075$ | | |
| | $R_7 = -3.550$ | | | |
| $L_5$ | $R_8 = -1.000$ | $t_5 = .283$ | $n_d = 1.720$ | $V = 29.3$ |
| $L_6$ | $R_9 = +.826$ | $t_6 = .450$ | $n_d = 1.697$ | $V = 56.2$ |

A modified form of the invention shown in FIG. 2 includes a telephoto attachment 14 for use with a prime lens 15. The attachment includes a front positive member or group of lenses composed of two positive components 11 and 12, and also has a rear negative component 13. The components 11, 12 and 13 include lenses $L_{11}$ to $L_{16}$ having radii of curvature $R_{11}$ to $R_{19}$, axial thicknesses $t_{11}$ to $t_{16}$ and axial separations $s_{11}$ and $s_{12}$, and the attachment is spaced axial separations $s_{13}$ from the prime lens. For compactness, the component 13 is greater in axial thickness than twenty percent of the overall axial length of the attachment and the sum of $t_{11}$ to $t_{16}$ is greater than sixty-five percent of the overall length of the attachment. To provide a very high degree of correction, the attachment is constructed in compliance with the algebraic inequalities listed above in connection with the description of the attachment 4 shown in FIG. 1.

A preferred example of the attachment 14 is constructed in compliance with the following table in which dimensions are in terms of inches and $n_d$ designates the refractive indices for the sodium D line, V the Abbe dispersion numbers and $f_{11}$, $f_{11+12}$ and $f_{13}$ the equivalent focal lengths of the component 11, the components 11 and 12 and the component 13, respectively:

|     |     |     |     |     |
| --- | --- | --- | --- | --- |
| $L_{11}$ | $R_{11}=+1.867$ | $t_{11}=.600$ | $n_d=1.517$ | $V=64.5$ |
| $L_{12}$ | $R_{12}=-2.400$ | $t_{12}=.120$ | $n_d=1.720$ | $V=29.3$ |
|     | $R_{13}=-4.760$ | $s_{11}=.1642$ |     |     |
| $L_{13}$ | $R_{14}=+2.258$ | $t_{13}=.283$ | $n_d=1.620$ | $V=60.0$ |
|     | $R_{15}=-7.500$ |     |     |     |
| $L_{14}$ | $R_{16}=+2.894$ | $t_{14}=.120$ | $n_d=1.649$ | $V=33.8$ |
|     | $R_{17}=-2.125$ | $s_{12}=.405$ |     |     |
| $L_{15}$ | $R_{18}=-.707$ | $t_{15}=.400$ | $n_d=1.720$ | $V=29.3$ |
| $L_{16}$ | $R_{19}=+1.231$ | $t_{16}=.275$ | $n_d=1.697$ | $V=56.2$ |

While the above objectives have been described as combinations of prime lenses 5 and 15 and attachments 4 and 14 detachable from the prime lenses, the attachments obviously may be made permanent with the prime lenses in which constructions, the attachments may be of the focal type rather than afocal with compensating changes in the prime lenses. Also, while the components 1, 3, 11, 12 and 13 are in the form of cemented compound components, they obviously may be of the air separated or edge contact type. Further, the components 3 and 13 while shown as compound components may be simple negative lenses.

The attachments 4 and 14 are highly corrected, compact afocal lens systems, and effect high magnifications.

While the invention is thus described, it is not wished to be limited to the precise details described, as changes may be readily made without departing from the spirit of the invention.

What is claimed is:

1. In a telephoto lens system, a front positive cemented triplet, a second positive meniscus singlet behind the triplet, and a third biconcave doublet behind the singlet, and being further characterized in that the system is constructed in substantial compliance with the following table in which dimensions are in terms of inches, and proceeding from front to rear, $L_1$ to $L_6$ designate the lenses, $R_1$ to $R_8$ the respective radii of curvature of the surfaces, $t_1$ to $t_6$ the axial thicknesses, $s_1$ and $s_2$ the axial separations, $n_d$ the indices of refraction for the sodium D line and V the Abbe dispersion numbers:

|     |     |     |     |     |
| --- | --- | --- | --- | --- |
| $L_1$ | $R_1=+1.950$ | $t_1=.457$ | $n_d=1.697$ | $V=56.2$ |
|     | $R_2=-4.567$ | $t_2=.120$ | $n_d=1.720$ | $V=29.3$ |
| $L_2$ | $R_3=+2.737$ |     |     |     |
| $L_3$ | $R_4=6.326$ | $t_3=.350$ | $n_d=1.697$ | $V=56.2$ |
|     |     | $s_1=.060$ |     |     |
|     | $R_5=+2.0689$ |     |     |     |
| $L_4$ | $R_6=+2.894$ | $t_4=.200$ | $n_d=1.697$ | $V=56.2$ |
|     | $R_7=-3.550$ | $s_2=.075$ |     |     |
| $L_5$ | $R_8=-1.000$ | $t_5=.283$ | $n_d=1.720$ | $V=29.3$ |
| $L_6$ | $R_9=+.826$ | $t_6=.450$ | $n_d=1.697$ | $V=56.2$ |

2. In a telephoto lens system, a front positive cemented doublet, an intermediate positive meniscus cemented doublet, and a rear biconcave cemented doublet, and being further characterized in that said system is constructed in substantial compliance with the following table in which dimensions are in terms of inches, and proceeding from front to rear $L_{11}$ to $L_{16}$ designate the lenses, $R_{11}$ to $R_{19}$ the radii of curvature of the surfaces, $t_{11}$ to $t_{16}$ the axial thicknesses, $s_{11}$ and $s_{12}$ the axial separations, $n_d$ the indices of refraction for the sodium D line and V the Abbe dispersion numbers:

|     |     |     |     |     |
| --- | --- | --- | --- | --- |
| $L_{11}$ | $R_{11}=+1.867$ | $t_{11}=.600$ | $n_d=1.517$ | $V=64.5$ |
| $L_{12}$ | $R_{12}=-2.400$ | $t_{12}=.120$ | $n_d=1.720$ | $V=29.3$ |
|     | $R_{13}=-4.760$ | $s_{11}=.1642$ |     |     |
|     | $R_{14}=+2.258$ | $t_{13}=.283$ | $n_d=1.620$ | $V=60.0$ |
| $L_{13}$ | $R_{15}=-7.500$ |     |     |     |
| $L_{14}$ | $R_{16}=+2.894$ | $t_{14}=.120$ | $n_d=1.649$ | $V=33.8$ |
|     | $R_{17}=-2.125$ | $s_{12}=.405$ |     |     |
| $L_{15}$ | $R_{18}=-.707$ | $t_{15}=.400$ | $n_d=1.720$ | $V=29.3$ |
| $L_{16}$ | $R_{19}=+1.231$ | $t_{16}=.275$ | $n_d=1.697$ | $V=56.2$ |

References Cited in the file of this patent

UNITED STATES PATENTS

| | | |
|---|---|---|
| 2,169,130 | Tronnier et al. | Aug. 8, 1939 |
| 2,184,018 | Ort | Dec. 19, 1939 |
| 2,366,597 | Cox | Jan. 2, 1945 |
| 2,387,497 | Cox | Oct. 23, 1945 |
| 2,394,635 | Reiss | Feb. 12, 1946 |
| 2,433,438 | Cox | Dec. 30, 1947 |
| 2,803,167 | Kohler et al. | Aug. 20, 1957 |
| 2,913,956 | Solisch | Nov. 24, 1959 |